United States Patent [19]

Williams

[11] Patent Number: 4,898,319

[45] Date of Patent: Feb. 6, 1990

[54] AMBIENT AIR EXCLUSION SYSTEM FOR BRAZING OVENS

[75] Inventor: Robert T. Williams, Newfane, N.Y.

[73] Assignee: Bruce T. Williams, Lockport, N.Y.

[21] Appl. No.: 128,933

[22] Filed: Dec. 4, 1987

[51] Int. Cl.⁴ .......................... F27D 7/00; B23K 1/04; B23K 35/38

[52] U.S. Cl. ...................................... 228/219; 228/42; 219/214; 219/400; 219/85.17; 432/64

[58] Field of Search ........................... 228/219, 42, 57; 219/85 E, 400, 214; 432/64; 165/135

[56] References Cited

U.S. PATENT DOCUMENTS

| | | | |
|---|---|---|---|
| 3,397,631 | 8/1968 | Simons | 432/64 |
| 3,448,969 | 6/1969 | Windsor | 432/64 |
| 3,575,398 | 4/1971 | Lincoln | 432/64 |
| 3,674,903 | 7/1972 | Bintzer | 432/64 |
| 4,551,091 | 11/1985 | Paterson | 432/64 |

FOREIGN PATENT DOCUMENTS

| | | | |
|---|---|---|---|
| 562297 | 6/1944 | United Kingdom | 432/64 |

*Primary Examiner*—Nicholas P. Godici
*Assistant Examiner*—Samuel M. Heinrich
*Attorney, Agent, or Firm*—Christel, Bean & Linihan

[57] ABSTRACT

A brazing oven includes an arrangement employing a gas curtain or barrier to cover the port or opening of the oven whenever the door is opened. The curtain or barrier is formed by a region of flowing conditioned air directed across the opening. The flowing air curtain or barrier prevents gas from exiting the oven interior when the door is opened, and it also serves to replace or replenish any conditioned air which happens to escape from the oven interior. The air curtain or barrier is generated by a ported manifold and supply located either on the oven housing exterior adjacent the opening or inside the oven housing adjacent the opening.

10 Claims, 4 Drawing Sheets

AMBIENT AIR EXCLUSION SYSTEM FOR BRAZING OVENS

BACKGROUND OF THE INVENTION

This invention relates to the art of vacuum brazing of metals, and more particularly to a new and improved brazing oven and method of operating the same.

When brazing aluminum or other materials in production operations, the brazing is performed under vacuum conditions to prevent the formation of metal oxides which would impede the formation of smooth, sound brazed joints. For example, in a typical aluminum brazing process, the materials to be joined by braze are moved into a vacuum oven. The air is evacuated from the oven, and heat is applied to the materials, typically by induction or radiant heaters, to cause the brazing to occur. After brazing, the oven is refilled with air to equalize oven and atmospheric pressure so that the oven door may be opened to allow the materials to be removed.

A difficult problem which is often encountered in this process lies with the introduction of unconditioned, i.e. water ladened, air into the oven during the exchange of materials to and from the oven. The introduction of water into the oven is troublesome because during the oven pump down, i.e. air evacuation, process before brazing, any water present will turn into a gas form under heat and reduced pressure conditions and add gas, i.e. water vapor, into the oven, thus requiring increased pump down time and increased production time. Also, more importantly, in aluminum brazing operations, magnesium and other materials are released from the brazing materials or brazing fluxes, and are deposited on the walls of the oven. The magnesium, or other material, being highly hydroscopic will readily absorb moisture, i.e. water, particularly at high temperature, from the air to form hydrous magnesium. Before a deep vacuum can again be reached in the oven, the absorbed water must leech from the hydrous magnesium which requires a variable pump down time, depending upon the amount of absorbed water, thus increasing dramatically the production time and/or the variation in time to complete a brazing cycle.

The typical solution to this problem has been to refill the oven only with conditioned, i.e. dry, air after the braze cycle and before oven door opening. However, this is only a partial solution because upon door opening, the dry refilling air which has been heated by the heated materials and oven walls, being less dense and lighter than the cooler atmospheric air outside the oven, will flow through the upper section or area of the open door and will be replaced with unconditioned air, i.e. moisture ladened, from the atmosphere through the lower section or area of the door, thus introducing water into the next pump down and brazing cycle. Other prior art solutions have involved adding pumps or pump capacity in view of the increased pump downtime caused by moisture in the air.

SUMMARY OF THE INVENTION

It is, therefore, a primary object of this invention to provide a new and improved brazing oven and method of operating the same.

It is a further object of this invention to provide such an oven and method which prevents the flow of heated conditioned, i.e. dried, air from exiting the oven when the port of the oven is uncovered.

It is a further object of this invention to provide such an oven and method which will not allow the introduction of unconditioned air into the brazing oven during the material exchange process through the open oven door.

It is a further object of this invention to provide such an oven and method which will provide, in the event that heated conditioned air does escape from the oven, a source of conditioned, i.e. dried, air which will replace the volume of exiting conditioned air so that unconditioned air is excluded from the air exchange process.

It is a further object of this invention to provide such an oven and method which decreases production time by achieving a higher production rate by decreasing the time required for pumping the oven to a vacuum condition proper for brazing by excluding the introduction of water ladened or unconditioned air into the oven during material exchange to and from the oven.

It is a further object of this invention to provide such an oven and method which increases the quality and reliability of the brazed materials, by reducing the variations in pump down time and heating element actuation time caused by the introduction of various levels of moisture from un-conditioned air, by allowing only conditioned air which has a known moisture content to enter the oven during the materials exchange process.

It is a further object of this invention to provide such an oven and method which allows the production time for brazing materials to be fixed and thereby provide a smooth brazing production process integrated with other production line operations associated with the brazing operation.

It is a further object of this invention to provide such an oven which reduces energy losses and provides a cooler working environment by eliminating the flow of heated conditioned air from the oven into the surrounding environment.

It is a further object of this invention to provide such a method and apparatus which can be easily added or adapted to existing oven designs or to ovens already installed into production processes.

The present invention provides in a brazing oven means employing a gas curtain or barrier to cover the port or opening of the oven whenever the door is opened. The curtain or barrier is formed by a region of flowing conditioned air directed across the opening. The flowing air curtain or barrier prevents gas from exiting the oven interior when the door is opened, and it also serves to replace or replenish any conditioned air which happens to escape from the oven interior. The air curtain or barrier is generated by a ported manifold and supply located either on the oven housing exterior adjacent the opening or inside the oven housing adjacent the opening.

The foregoing and additional advantages and characterizing features of the present invention will become clearly apparent upon a reading of the ensuing detailed description together with the included drawing wherein:

BRIEF DESCRIPTION OF THE DRAWING FIGURES

FIG. 1 is a top plan diagrammatic view, partly in section, of a prior art brazing oven;

FIG. 2*a* is a fragmentary diagrammatic perspective view of an oven of the type illustrated in FIG. 1;

FIG. 2*b* is a fragmentary diagrammatic perspective view of another form of prior art brazing oven;

DETAILED DESCRIPTION OF THE ILLUSTRATED EMBODIMENTS

Figure 1:
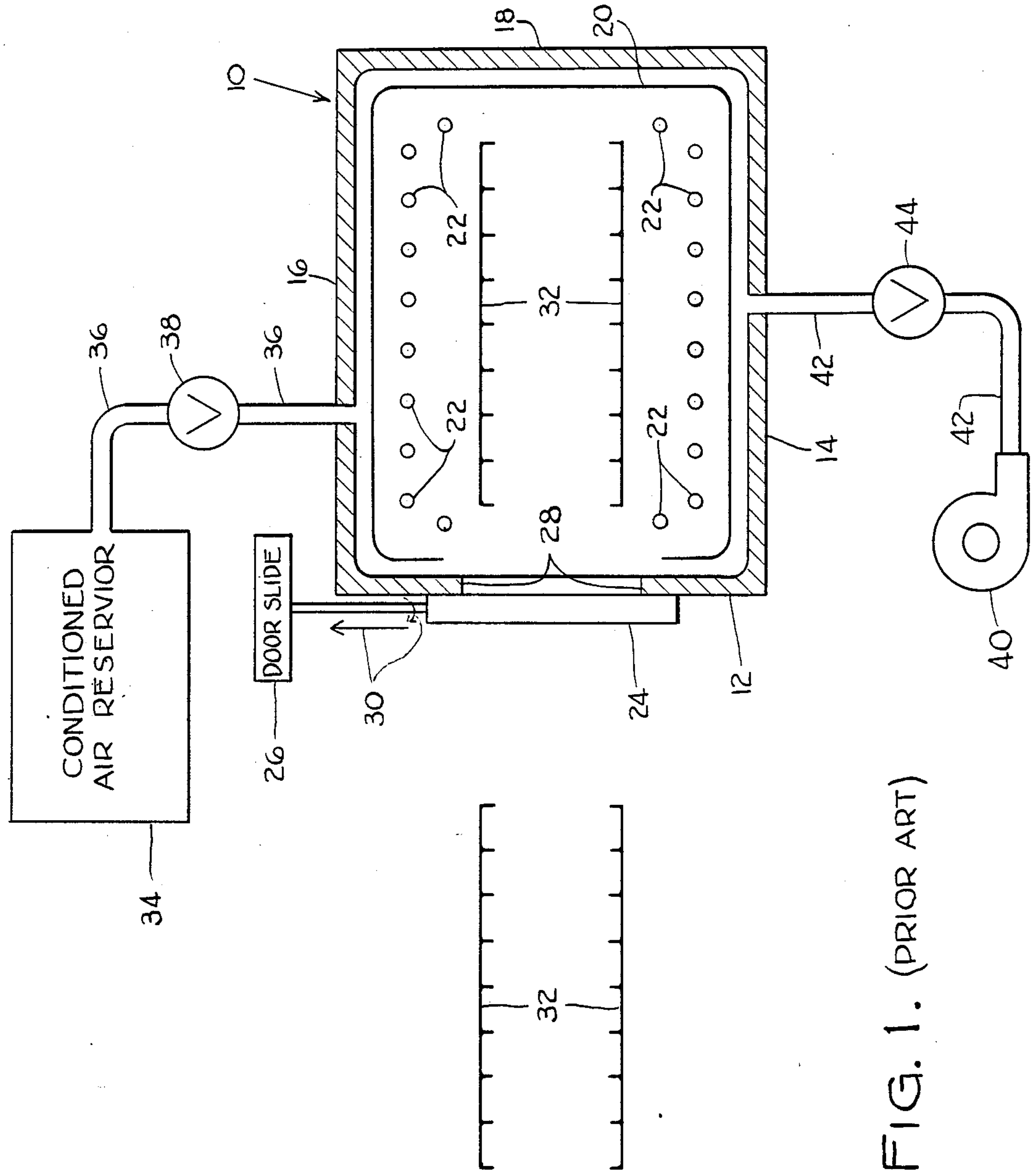
FIG. 1. (PRIOR ART)

FIG. 1 shows a typical single stage brazing oven to which the present invention is applicable. This invention also can be used with equal success and advantage on multi-stage brazing ovens which may employ multiple doors. There is shown in FIG. 1, in cutaway, a brazing oven 10, the major components of which are: the oven walls 12, 14, 16, 18, heat shield 20, heating elements 22, vacuum door 24, door slide 26, port or opening 28 which is made open by moving door 24 away from the port and along door slide 26. The arrows 30 associated with the door slide 26 show that the door 24 is first moved in a direction normal to the port 28 to clear the vacuum seals associated with port 28 and then moved to clear the port so that materials can be moved in and out of oven 10 through port 28 along the materials carrier track system 32. Associated with oven 10 is conditioned air (dried air) reservoir 34 which is in fluid communication with the oven 10 through pipe 36 under control of a valve 38. An air pump 40 also is connected to the oven interior through a pipe 42 under control of a valve 44.

In operation, door 24 fully exposes port 28 to allow entry of materials along track 32. The door 24 then is closed. Air pump 40 is activated with valve 44 open to allow air to be evacuated from oven 10. When a deep vacuum has been reached, heating elements 22 are energized to cause brazing to begin. After brazing is completed, heating elements 22 are de-energized, pump 40 and valve 44 are de-activated and valve 38 is opened to allow conditioned air (dried air) from reservoir 34 to enter the oven.

Figure 2B:
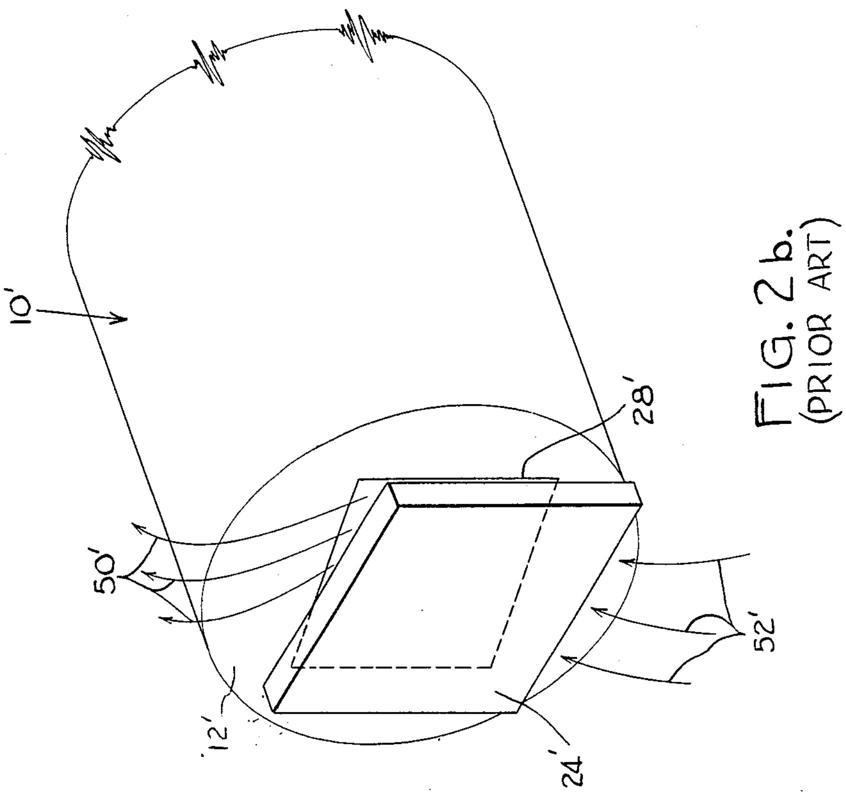
FIG. 2b. (PRIOR ART)
Figure 2A:
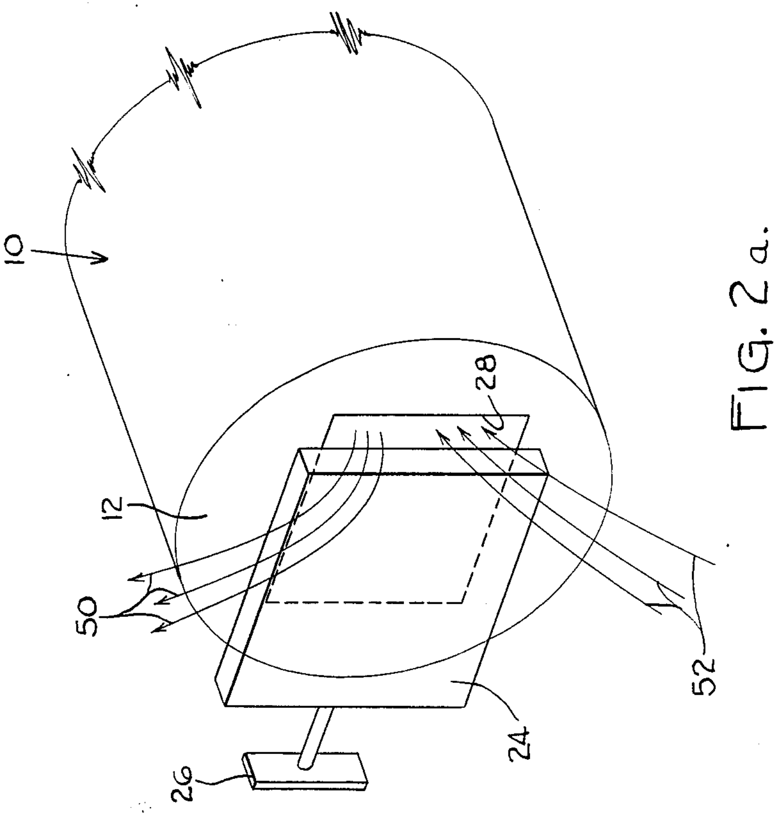
FIG. 2a. (PRIOR ART)

After the oven internal pressure is equal to atmospheric pressure, door 24 is un-sealed and slid back to expose port 28 to allow the brazed contents to be removed. At this time, unconditioned (water ladened) air will enter the oven. This is illustrated in FIG. 2, which shows a fragmentary view of the end of oven 10. FIG. 2*a* shows a partially opened door 24 with the heated conditioned air, shown by arrows 50, which has been heated by the hot materials in the oven 10 as well as the heated oven walls and heat shields, flowing out of the top portion of port 28 and atmospheric unconditioned air, shown by arrows 52, flowing into the bottom portion of the port 28. This flow of hot and cold gas by gravitational forces is conventionally known. Shown in FIG. 2*b* is a door 24' and port 28' of a brazing oven 10' where the door is of the hinged type. Here again, when door 24' is opened, the flow of heated conditioned air and cooler un-conditioned (water ladened) air occurs.

In accordance with the present invention, there is provided means operatively associated with the opening 28 of oven 10 for providing a flow of gas in opening 28 when door 24 is open to provide a barrier to prevent gas from exiting the oven interior when the door is opened. Thus, the present invention employs an air curtain or air barrier to cover the port of the oven whenever the oven door is opened, and the air curtain or barrier is formed by a region of flowing conditioned air placed at the port of the oven and generated by a ported air manifold.

Figure 3:
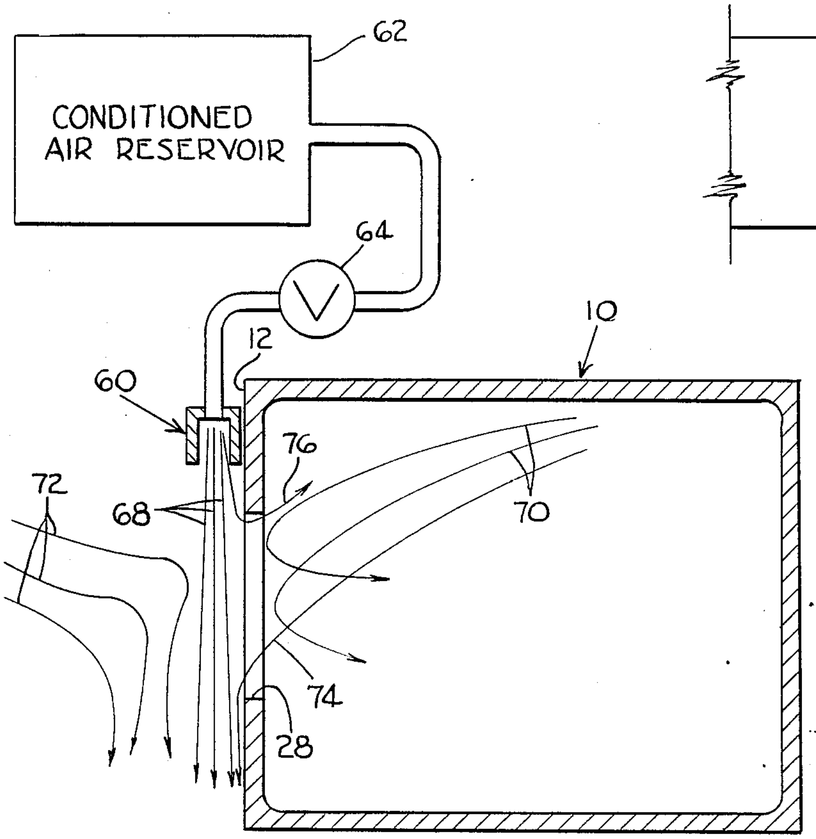
FIG. 3 is a vertical sectional view, partly diagrammatic, of a brazing oven provided with gas curtain or barrier means according to the present invention and with the oven door removed for purposes of illustration.

Referring now to FIG. 3, oven 10 in FIG. 3 is identical to oven 10 in FIG. 1 and has the same associated components which are not shown in FIG. 3 merely for convenience in illustration. Thus oven 10 in FIG. 3 would have a heat shield, heating elements, track system, door, conditioned air reservoir with control valve and conduit to the oven interior and vacuum pump with control valve and conduit to the oven interior just like oven 10 in FIG. 1. As shown in FIG. 3, the means for providing a flow of gas along or across opening 28 comprises ported manifold means generally designated 60 which, in the oven illustrated in FIG. 3, is mounted in a suitable manner to the exterior surface of housing end wall 12 adjacent opening 28. Manifold 60 is located and disposed so as to direct gas, i.e. conditioned air, along or across opening 28 in a manner providing a curtain or barrier as will be described. Manifold 60 is connected in fluid communication to conditioned air reservoir 62 through a control valve 64. Just prior to the oven door (not shown in FIG. 3) opening, valve 64 is activated to generate a region of high air pressure, indicated by arrows 68, across the port 28 originating from the port of air manifold 60. This region of pressurized air will form an air curtain or barrier which will not allow either the heated conditioned air, indicated by arrows 70, within the oven 10 to escape to the atmosphere nor the unconditioned atmospheric air, noted by arrows 72, to enter the oven 10. In the event some portion of the heated conditioned air, as noted by arrow 74, does leave the oven and join with the air curtain flow, it will be quickly replaced with conditioned air from the curtain or barrier as indicated by arrow 76.

Figure 4:
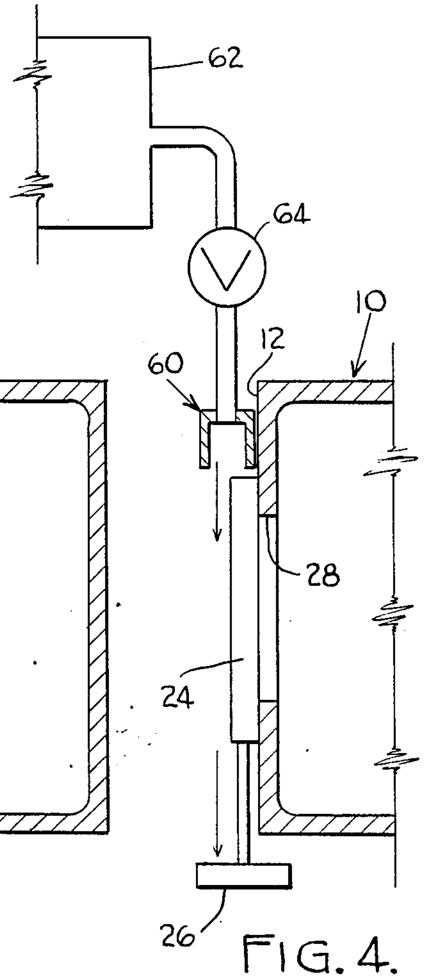
FIG. 4 is a fragmentary vertical sectional view of the oven of FIG. 3 and showing the door in a closed position.

FIG. 4 illustrates the positioning and location of manifold 60 relative to door 24, the latter being shown in a closed position. While manifold 60 is illustrated in FIGS. 3 and 4 as extending along one side or edge of the oven port or opening 28, i.e. horizontally along the top edge, manifold 60 can continue and extend along one or more additional sides or edges of the opening 28 if desired for higher efficiency. Alternatively, the manifold can extend along either of the vertical sides of the opening, or along the bottom edge of the opening as will be described.

Figure 5:
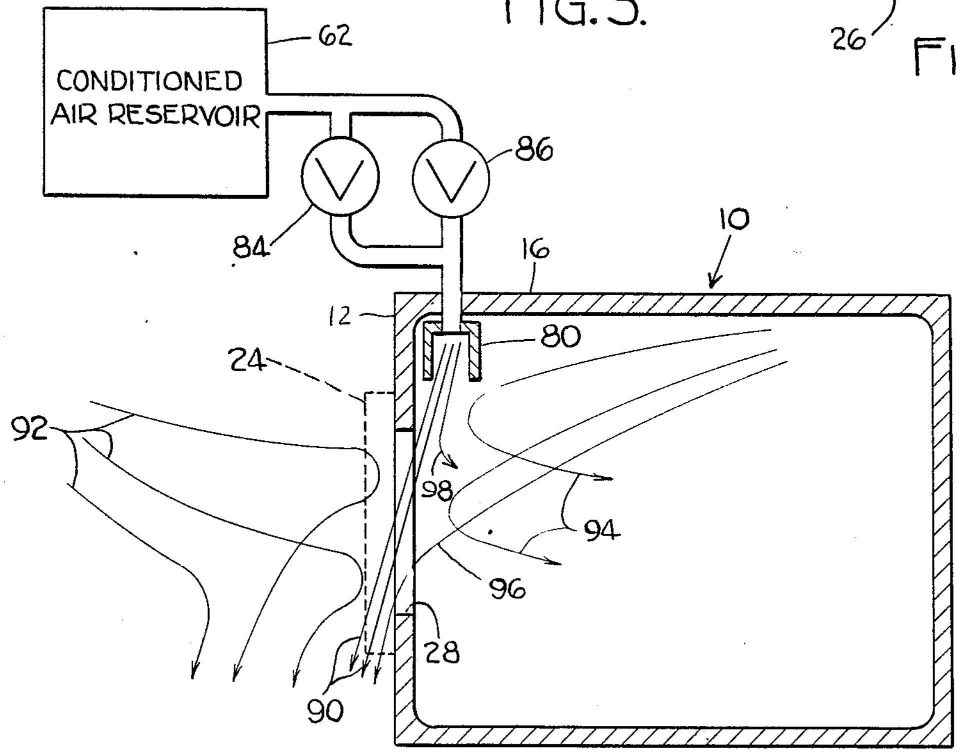
FIG. 5 is a vertical sectional view, partly diagrammatic, of a brazing oven provided with gas curtain or barrier means according to another embodiment of the present invention.

FIG. 5 illustrates an arrangement according to another embodiment of the present invention wherein a manifold 80, similar to manifold 60, is placed on the inside of the oven 10 to avoid interference with the oven door 24 (shown in broken lines). As in the case of oven 10 shown in FIGS. 3 and 4, oven 10 shown in FIG. 5 is identical to oven 10 shown in FIG. 1 and has the same associated components which are not shown in FIG. 5 merely for convenience in illustration. Manifold 80 is mounted in a suitable manner inside oven 10 and as illustrated in FIG. 5 adjacent the intersection of the inner surface of housing walls 12 and 16. This embodiment also has the advantage of allowing the manifold 80 to serve as the oven air refilling supply port to refill the oven with conditioned air after brazing. Manifold 80 is connected to conditioned air reservoir 62 through valves 84 and 86. Valves 84 and 86 may be used to allow for different pressures for refilling and air curtain maintenance, or a single valve could be used if such pressure differences are not important. Manifold 80 is located and disposed so as to direct gas, i.e. conditioned air, along or across opening 28 in a manner providing a curtain or barrier of gas indicated by arrows 90. In FIG. 5, as in FIG. 3, unconditioned air indicated by arrows 92 is excluded from oven 10 while conditioned air indicated by arrows 94 is impeded from leaving the oven 10. Again, in the event some portion of the heated conditioned air does escape, as shown by arrow 96, it will be replaced by the conditioned air curtain supply as indicated by arrow 98.

The lines and arrows of FIGS. 3 and 4 are only used to denote approximate air flow patterns. The design of the air manifold 60,80 can be varied to obtain higher efficiency by altering the width of the curtain and/or amount of curtain pressure required to obtain effective exclusion of unconditioned air from the oven, with the least amount of wasted conditioned air. Although the embodiments show a manifold which is placed along a single side or area of the oven portion or opening 28, it could also be placed along two or more sides or areas of the port for higher efficiency.

Figure 6:
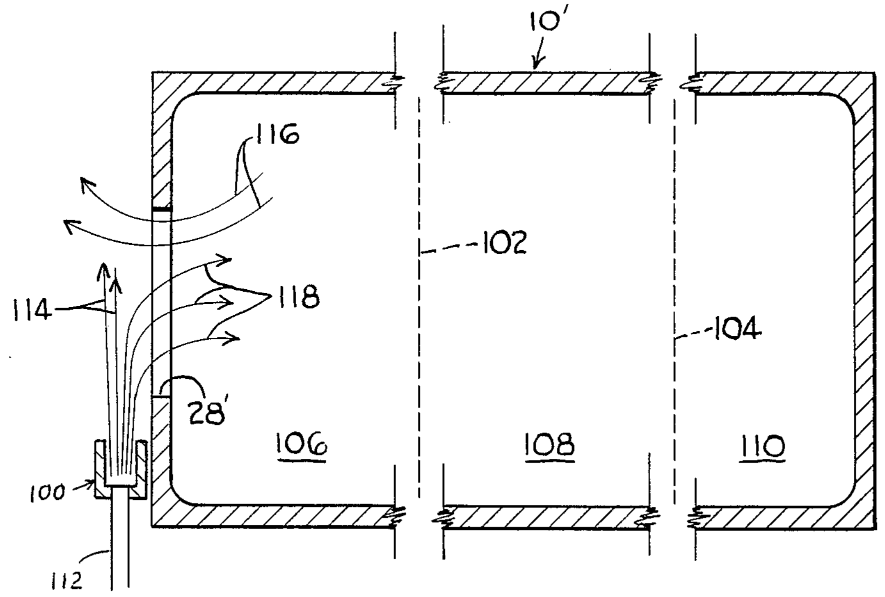
FIG. 6 is a fragmentary vertical sectional view, partly diagrammatic, of a brazing oven provided with gas curtain or barrier means according to another embodiment of the present invention.

FIG. 6 illustrates an arrangement according to another embodiment of the present invention wherein a manifold 100, similar to manifolds 60 and 80 of the previous embodiments, is located on the outside of and along the lower or bottom edge of the oven port or opening for the purpose of allowing venting of hot air from the oven interior. Oven 10′ shown in FIG. 6 is a multi-chamber oven in contrast to the single chamber ovens of the previous embodiments. The broken lines 102 and 104 in FIG. 6 diagrammatically represent the appropriate structural separation or divisions defining the various chambers, in the present illustration the three chambers 106, 108 and 110. Chambers 106 adjacent the oven port or opening 28′ functions as an air lock and no work done in the chamber. The other chambers 108,110 are the working chambers. Oven 10′ would have a heat shield, heating elements, track system and door similar to oven 10 of the previous embodiments. Oven 10′ would also have, operatively connected to either or both of the working chambers 108 and 110, a conditioned air reservoir with control valve and conduit to the oven interior, and a vacuum pump with control valve and conduit to the oven interior. As shown in FIG. 6, the means for providing a flow of gas along or across opening 28′ comprises ported manifold means generally designated 100 which, in the oven illustrated in FIG. 6, is mounted in a suitable manner to the exterior surface of the oven housing end wall adjacent opening 28′ and extending along the lower side or edge of opening 28′, the manifold 100 being disposed generally horizontally in use. Manifold 100 is connected by conduit 112 and through at least one control valve to the conditioned air reservoir (not shown).

Manifold 100′ is located and disposed so as to direct gas, i.e. conditioned air, along or across opening 28′ in a manner providing a curtain or barrier of gas indicated by arrows 114. The flow of gas from manifold 100′ is upwardly along opening 28′. Hot gas or air is allowed to escape or vent from exit chamber 106 as indicated by the arrows 116 in FIG. 6 and this air is replaced by conditioned air from the curtain as indicated by arrows 118.

Although exit chamber 106 functions as an air lock and no work associated with the brazing operation is done therein, chamber 106 can clad up with magnesium which holds moisture. A hot load exiting the oven passing through chamber 106 can withdraw or extract such moisture from the magnesium coating on the chamber walls thereby causing contamination. Providing manifold 100 in the arrangement of FIG. 6 allowing venting of chamber 106 avoids this problem.

The present invention is illustrated further by the following example. A three chamber oven similar to that shown in FIG. 6 was employed including an opening 28′ 44 inches wide and 50 inches high. The manifold 100 was about 44 inches in length and was provided with a discharge slot along its length disposed vertically in a plane substantially parallel to the plane of the oven opening 28′ and having a slot width of 0.020 inch. Manifold 100 was supplied with heated conditioned air at 100 pounds pressure through a $\frac{3}{4}$ inch diameter feed line. Hot air was allowed to escape from the oven exit chamber 106 and was replenished from the air curtain provided by manifold 100. Operating the oven without the air curtain from manifold 100 required about 15 minutes to achieve a vacuum level in the oven of 60 microns. Operating the oven with the air curtain supplied by manifold 100 required only about 5 minutes to achieve a one micron vacuum level in the oven.

Figure 7:
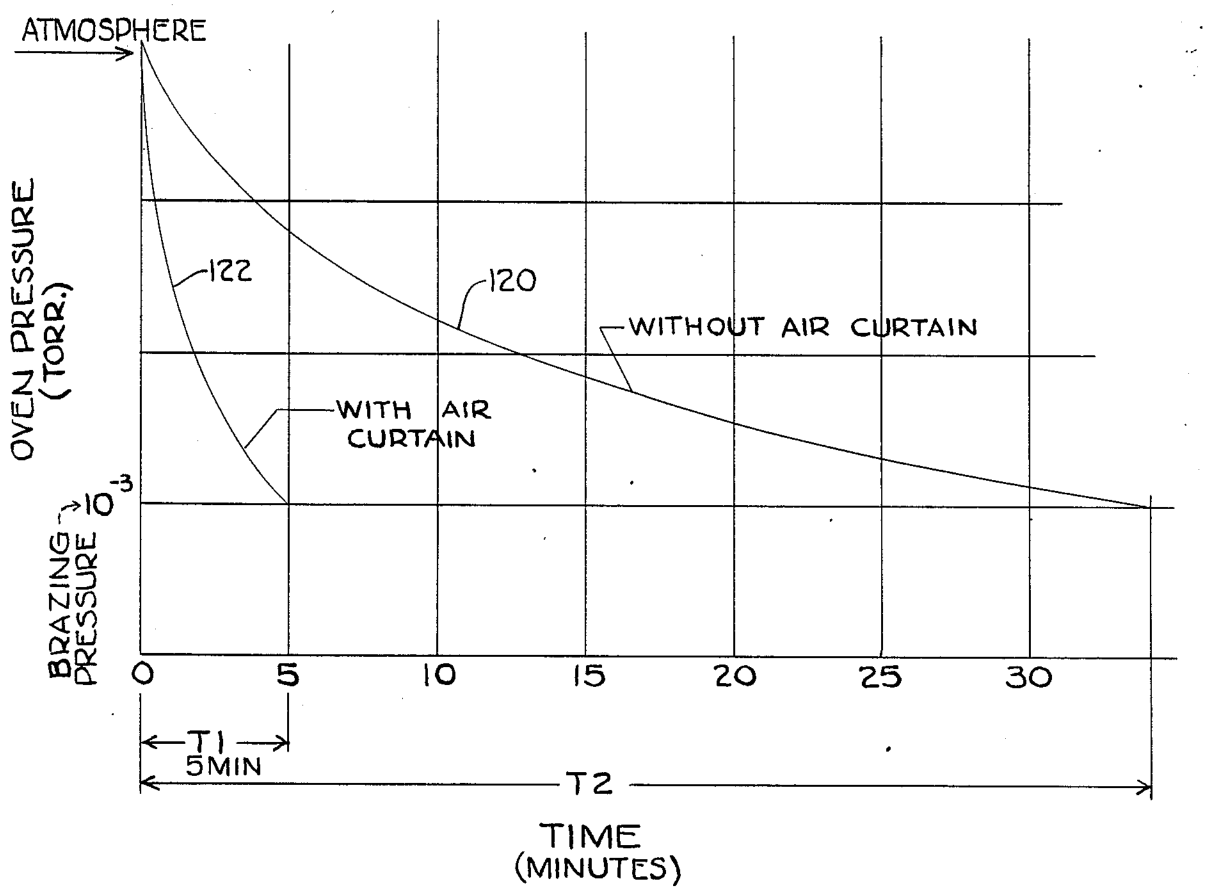
FIG. 7 is a graph illustrating operation of the oven of FIG. 6.

The foregoing is illustrated further by FIG. 7 which is a graph of oven pressure vs. pump down time with and without the air curtain of the present invention. As indicated by curve 120, without the air curtain of the present invention, a pump down time, i.e. time during which the pump operates to reduce the oven interior pressure from atmospheric to vacuum, of about 32 minutes is required to achieve oven brazing pressure of $10^{-3}$ torr. In contrast, as illustrated by curve 122, with the air curtain of the present invention, a pump down time of only about 5 minutes is required to achieve oven brazing pressure of $10^{-3}$ torr.

The air pressure in the manifold is determined by factors of size of the oven opening, amount of heat in the oven, and whether the oven heat is to be released or retained. In a single chamber oven of the type shown in FIGS. 3–5 the heat should be retained for the next operating cycle. In a multi-chamber oven like that of FIG. 6, on the other hand, retaining heat in the exit chamber is not a consideration. While supply of air to the manifold has been provided from a conditioned air reservoir in the foregoing examples, as an alternative hot air can be reclaimed from the oven chamber and used for the air curtain.

It is therefore apparent that the present invention accomplishes its intended objects. By virtue of the invention, the flow of heated conditioned air is prevented from exiting oven 10 when door 24 is opened and unconditioned air is not allowed to enter the oven during the material exchange process through the opened oven door. In the event that some heated conditioned air does escape from the oven, a source of conditioned air is provided which replaces the amount of exiting conditioned air so that un-conditioned air is excluded from the air exchange process. As a result of the foregoing, production time is decreased by achieving a higher production rate by decreasing the time required for evacuating oven 10 to a vacuum condition for brazing by excluding the introduction of water-laden or unconditioned air into oven 10 during material exchange to and from the oven. In addition, the foregoing increases the quality and reliability of the brazed materials by reducing the variations in pump down time and heating element actuation time caused by the introduction of various levels of moisture from un-conditioned air, by allowing only conditioned air which has a known moisture content to enter oven 10 during the material exchange process. This, in turn, allows the production time for brazing materials to be fixed and thereby provide a smooth brazing production process integrated with other production line operations associated with the brazing operation. The foregoing also reduces energy losses and provides a cooler working environment by eliminating the flow of heated conditioned air from the oven into the surrounding environment. In addition, the apparatus of the present invention could be easily supplied as a kit for attachment to existing oven designs or to ovens already installed into production processes.

While embodiments of the present invention have been described in detail, that is for the purpose of illustration, not limitation.

I claim:

1. In a brazing oven including a housing defining an interior region in which materials to be brazed are placed, an opening in said housing to allow introduction and removal of the materials, a door operatively associated with said opening for closing said opening during brazing and for opening during introduction and removal of the materials, means for heating the materials in said region, and means for providing a vacuum in said region during brazing, the improvement comprising:

means operatively associated with said opening for providing a flow of gas along one direction in said opening when said door is opened to provide a single barrier to prevent gas from exiting the oven interior and to prevent unconditioned ambient air from entering the oven interior when said door is opened, said barrier being provided exclusively by said flow of gas, said means for providing a flow of gas comprising:

(a) ported manifold means mounted in said housing interior adjacent the inside of said opening for providing a flow of gas across said opening; and (b) reservoir means in fluid communication with said manifold means to supply gas to said manifold means;

(c) so that said manifold means also serves to introduce conditioned gas to said region after brazing.

2. The improvement according to claim 1, further including valve means operatively associated with said reservoir means for controlling the supply of gas to said manifold means.

3. A method for brazing materials in an oven having a housing defining an interior region, an opening in said housing to allow access to said region and a door for opening and closing said opening, comprising the steps of:

(a) moving materials to be brazed into said oven interior when said door is opened;

(b) closing said door and evacuating gas from said region to provide a vacuum therein;

(c) heating said materials to braze the same;

(d) introducing gas to said interior to equalize the pressure between the interior of said oven and the external air surrounding said housing;

(e) providing a flow of gas in one direction across said opening as said door is opened to provide a single barrier to prevent exit of gas from the oven interior and to prevent entry of gas surrounding said housing from entering said oven interior, said barrier being provided exclusively by said flow of gas; and (f) conditioning the barrier-providing gas prior to providing the flow across said opening so that any gas which escapes from said oven interior is replaced by said conditioned gas.

4. A method according to claim 3, wherein said step of providing a flow of gas across said opening is performed external to the region adjacent said opening.

5. A method according to claim 3, wherein said step of providing a flow of gas across said opening is performed inside of said oven region adjacent said opening.

6. In a brazing oven including a housing defining an interior region in which materials to be brazed are placed, an opening in said housing to allow introduction and removal of the materials, a door operatively associated with said opening for closing said opening during brazing and for opening during introduction and removal of the materials, means for heating the materials in said region, means for providing a vacuum in said region during brazing and means for introducing conditioned gas to said region after brazing, the improvement comprising:

manifold means operatively associated with said opening located outwardly and below said opening for providing a flow of gas only upwardly along said opening when said door is opened in a manner so that any portion of gas from the oven interior which might exit through the open door is replenished from said flow along said opening and the remainder of the gas in the oven interior is prevented from leaving said interior and gas surrounding said housing is prevented from entering said oven interior when said door is opened, said manifold means being the exclusive means for providing said flow of gas from replenishing and for preventing interior gas from leaving and exterior gas from entering the oven.

7. The improvement according to claim 6, further including reservoir means in fluid communication with said manifold means to supply gas to said manifold means.

8. The improvement according to claim 7, further including valve means operatively associated with said reservoir means for controlling the supply of gas to said manifold means.

9. A method for brazing materials in an oven having a housing defining an interior region, an opening in said housing to allow access to said region and a door for opening and closing said opening, comprising the steps of:

(a) moving materials to be brazed into said oven interior when said door is opened;

(b) closing said door and evacuating gas from said region to provide a vacuum therein;

(c) heating said materials to braze the same;

(d) introducing gas to said interior to equalize the pressure between the interior of said oven and the external air surrounding said housing; and (e) providing a flow of gas across said opening only upwardly and outwardly thereof as said door is opened so that any portion of gas from the oven interior which might exit through the open door is replenished from said flow of gas across said opening and the remainder of the gas in the oven interior is prevented from leaving said interior and of gas surrounding said housing is prevented from entering said oven interior, said flow of gas being the exclusive method for replenishing and for preventing interior gas from leaving and exterior gas from entering the oven.

10. A method according to claim 9, further including conditioning the gas provided in the flow across said opening so that any gas which escapes from said oven is replaced by said conditioned gas.

* * * * *